United States Patent
Lim et al.

(10) Patent No.: US 7,191,460 B2
(45) Date of Patent: Mar. 13, 2007

(54) DISK PROTECTION CASING AND DRIVE FOR RECEIVING THE SAME

(75) Inventors: Jong Rak Lim, Sungnam (KR); Won Hyoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/033,623

(22) Filed: Jan. 13, 2005

(65) Prior Publication Data

US 2005/0120364 A1    Jun. 2, 2005

Related U.S. Application Data

(63) Continuation of application No. 10/848,115, filed on May 19, 2004, now Pat. No. 7,055,164, which is a continuation of application No. 10/337,999, filed on Jan. 8, 2003, now Pat. No. 6,757,240, which is a continuation of application No. 09/347,388, filed on Jul. 6, 1999, now Pat. No. 6,529,471.

(30) Foreign Application Priority Data

Jul. 15, 1998  (KR) ................... 98-28766
Jul. 16, 1998  (KR) ................... 98-28824

(51) Int. Cl.
*G11B 23/03* (2006.01)
(52) U.S. Cl. ................. 720/730; 720/733
(58) Field of Classification Search ........ 720/725, 720/728, 732, 733
See application file for complete search history.

(56) References Cited

U.S. PATENT DOCUMENTS

| | | |
|---|---|---|
| 3,951,264 A | 4/1976 | Heidecker et al. |
| 4,109,919 A | 8/1978 | Elliott et al. |
| 4,159,827 A | 7/1979 | Torrington |
| 4,617,655 A | 10/1986 | Aldenhoven |
| 4,707,821 A | 11/1987 | Verhagen |
| 4,749,081 A | 6/1988 | Carlson et al. |
| 4,755,982 A | 7/1988 | Douwes |
| 4,771,883 A | 9/1988 | Herr et al. |
| 4,773,061 A | 9/1988 | Stark et al. |
| 4,803,678 A | 2/1989 | Tanaka et al. |
| 4,849,958 A | 7/1989 | Douwes et al. |
| 4,881,640 A | 11/1989 | Herr et al. |
| 4,928,271 A | 5/1990 | Verhagen |
| 4,980,883 A | 12/1990 | Mutou et al. |
| 5,062,100 A | 10/1991 | Verhoeven et al. |
| 5,204,853 A * | 4/1993 | Kamoshita ............. 720/720 |

(Continued)

FOREIGN PATENT DOCUMENTS

EP    1067548 A1    1/2001

(Continued)

*Primary Examiner*—William J Klimowicz
(74) *Attorney, Agent, or Firm*—Birch, Stewart, Kolasch & Birch, LLP

(57) ABSTRACT

The disc protection casing includes a disc protection casing body having a disc receiving space therein. A disc holder, insertable into the interior of the disc protection casing body, has an elastic member formed at one end of the same for supporting a disc. When the disc holder is inserted into the casing body, a shoulder on the elastic member contacts a guide member in the casing body and the elastic member releases a disc supported thereby.

14 Claims, 9 Drawing Sheets

U.S. PATENT DOCUMENTS

| | | | |
|---|---|---|---|
| 5,537,389 A | 7/1996 | Kuwa et al. | |
| 5,548,571 A | 8/1996 | Mistretta | |
| 5,581,540 A | 12/1996 | Dang | |
| 5,859,829 A | 1/1999 | Otsuka et al. | |
| 5,867,476 A | 2/1999 | Yoshida et al. | |
| 5,923,630 A * | 7/1999 | Yoshida et al. | 720/720 |
| 5,995,482 A | 11/1999 | Iwazawa | |
| 6,002,556 A * | 12/1999 | Oishi | 360/133 |
| 6,108,298 A | 8/2000 | Miyazaki et al. | |
| 6,172,962 B1 | 1/2001 | Goto et al. | |
| 6,205,114 B1 | 3/2001 | Takekoh et al. | |
| 6,205,115 B1 | 3/2001 | Ikebe et al. | |
| 6,215,761 B1 | 4/2001 | Goto et al. | |
| 6,392,986 B1 * | 5/2002 | Yamashita | 720/725 |
| 6,396,800 B1 * | 5/2002 | Yamashita | 720/729 |
| 6,418,114 B1 * | 7/2002 | Yamashita | 720/731 |
| 6,426,938 B2 | 7/2002 | Lim et al. | |
| 6,522,623 B1 | 2/2003 | Fujita | |
| 6,529,471 B1 | 3/2003 | Lim et al. | |
| 6,757,240 B2 | 6/2004 | Lim et al. | |
| 6,847,605 B2 * | 1/2005 | Okamoto et al. | 720/719 |
| 2002/0136156 A1 * | 9/2002 | Nishino et al. | 369/291 |
| 2002/0181381 A1 | 12/2002 | Choi et al. | |

FOREIGN PATENT DOCUMENTS

| | | |
|---|---|---|
| JP | 63-304483 | 12/1988 |
| JP | 2-134781 | 5/1990 |
| JP | 03194761 A | 8/1991 |
| JP | 06333365 A | 12/1994 |
| JP | 07192367 A | 7/1995 |
| JP | 7-320359 | 12/1995 |
| JP | 10144031 A | 5/1998 |
| JP | 11213596 A | 8/1999 |
| JP | 2000195217 A | 7/2000 |

\* cited by examiner

DISK PROTECTION CASING AND DRIVE FOR RECEIVING THE SAME

This application is a Continuation of application Ser. No. 10/848,115, filed on May 19, 2004, now U.S. Pat. No. 7,055,164, which is a continuation of Ser. No. 10/337,999 filed on Jan. 8, 2003, now U.S. Pat. No. 6,757,240, which is a continuation of Ser. No. 09/347,388 filed on Jul. 6, 1999, now U.S. Pat. No. 6,529,471, and for which priority is claimed under 35 U.S.C. § 120; and this application claims priority of application No. 28766/1998 and application No. 28824/1998 filed in Korea on Jul. 15, 1998 and on Jul. 16, 1998 under 35 U.S.C. § 119; the entire contents of all are hereby incorporated by reference.

BACKGROUND OF THE INVENTION

1. Field of the Invention

The present invention relates to a disc protection casing and a drive for receiving the same.

2. Description of the Background Art

Types of a disc are classified into a reproducing-only type such as a CD-ROM, a DVD-ROM, etc., and a recordable type such as a WORM (Write Once Read Many) type, a rewritable type, etc. in accordance with the number of the data writing operations.

The writable-type disc is generally placed in a disc protection casing such as a cartridge, to protect the disc from external contamination or damage. It is required that the disc casing is designed to be opened when changing the disc.

Namely, when using a small size cartridge in a large size driving apparatus, since the small size cartridge does not have a certain size opening for the large size driving apparatus, the small size cartridge having a disc therein may not be used for the large size driving apparatus. Recently, a new cartridge capable of changing the disc inserted in the casing has been introduced in order to overcome the above-described problems.

As shown in FIG. 1, the cartridge includes a cartridge body 2 for receiving a disc 1 therein, and a disc holder 6 which may be detachably inserted via one edge of the cartridge body 2.

An opening (not shown) is formed in the bottom of the cartridge body 2, so that a pick-up unit of a drive can access the disc 1, and the opening is closed and opened by a shutter 4.

A receiving portion 5 is formed in the one edge of the cartridge body 2, so that the disc 1 may be inserted into the interior of the cartridge body 2.

In the thusly constituted conventional disc cartridge, when a user wishes to insert a bare state disc (the disc is separated from the cartridge body 2) into the cartridge body 2, the user holds a certain portion of a non-recorded surface of the disc 1 to prevent the data recorded surface from being contaminated and inserts the disc 1 into the receiving portion 5 of the cartridge body 2 and the inserts the disc holder 6 into the receiving port 5.

On the contrary, in a state that a disc 1 is already inserted in the interior of the cartridge body 2, in order to use a bare state disc 1, for removing the disc 1 from the cartridge body 2, the disc holder 6 is detached from the cartridge body 2, and the disc 1 falls down by gravity due to the weight of the disc through the receiving port 5 when the cartridge is held upright by the user.

However, in the conventional disc cartridge, in order to insert the disc into the interior of the cartridge body or remove the disc from the cartridge body, the user holds the disc and inserts the disc into the cartridge body or holds the disc falling from the cartridge body by the weight of the disc. In this case, the data recorded surface of the disc may be contaminated by pollutants or the like. Therefore, the disc must be very carefully handled.

As a very high capacity and high speed disc is introduced, if the disc is contaminated by pollutants and the like, it is impossible to reproduce the data recorded on the CD or a data reproducing error may occur.

In addition, discs are further classified into a disc having one recordable surface (hereinafter called a single sided disc) and a disc having two recordable surfaces (hereinafter called a double sided disc).

The single sided disc includes a recordable surface for recording and reproducing data and a label surface for attaching a label thereon, and the double sided disc includes only two recordable surfaces.

In the case of the single sided disc, the data recording surface is opposite to the optical pick-up unit and in the case of the double sided disc, one or both recordable surfaces of the double side disc may be opposite to the optical pick-up unit for thereby recording and reproducing the data. In the above-described structure, the disc holder 6 is inserted into the cartridge body 2 in a certain direction.

In the case of the single sided disc, the disc must be inserted in one direction, and in the case of the double sided disc, the surface to be recorded or reproduced must be inserted in a certain orientation.

However, when a user re-inserts a bare state single sided disc into the disc cartridge, since the conventional disc holder and the cartridge body are symmetrical, the user may erroneously insert the disc holder into the cartridge body, so that the insertion direction of the disc may be changed.

In particular, in the case of the single sided disc, even when the cartridge body and the disc holder are normally inserted, if the label surface of the disc is opposite to the optical pick-up unit can not access the disc.

Namely, when the disc is properly inserted into the cartridge body, and the disc holder is properly inserted thereinto, the disc is normally recorded and reproduced. Therefore, the user must carefully insert the disc into the disc cartridge, so that in the conventional art, there is much inconvenience to use the disc.

SUMMARY OF THE INVENTION

Accordingly, it is an object of the present invention to provide a disc protection casing and a drive for receiving the same which are capable of preventing a data recording surface of a disc from being contaminated when inserting and removing a disc.

It is another object of the present invention to provide a disc protection casing and a drive for receiving the same which are capable of easily separating a disc from the disc protection casing.

To achieve the above objects, there is provided a disc protection casing according to the present invention which includes a disc protection casing body having a disc receiving space therein, and a disc holder insertable into the interior of the disc protection casing body and having an elastic member formed at one end of the same for supporting the disc.

To achieve the above objects, there is also provided a disc holder according to the present invention which includes an elastic member engaged with a certain portion thereof for elastically supporting a disc, and a shoulder formed at one side of the elastic member for rotatably positioning and separating the disc in/from a receiving space of a drive.

In a disc protection casing and a drive for receiving the same according to the present invention, a disc protection casing for a single sided disc and a disc holder are inserted in a certain direction, and a double sided disc is inserted into a disc protection casing in a certain direction, so that it is possible to prevent an erroneous insertion of the disc.

To achieve the above objects, there is further provided a drive according to the present invention which includes a receiving portion including a disc protection casing having a disc receiving space therein, and disc holder receiving receivable in the disc protection casing body and having one end engaged with an elastic member for supporting a disc, and a recording and reproducing unit for recording and reproducing data on/from a disc received in the interior of the disc protection casing.

Additional advantages, objects and features of the invention will become more apparent from the description which follows.

BRIEF DESCRIPTION OF THE DRAWINGS

The present invention will become more fully understood from the detailed description given hereinabove and the accompanying drawings which are given by way of illustration only, and thus are not limitative of the present invention, and wherein.

DETAILED DESCRIPTION OF THE PREFERRED EMBODIMENTS

The disc protection casing and a drive for receiving the same according to the present invention will be explained with reference to the accompanying drawings.

Figure 1:
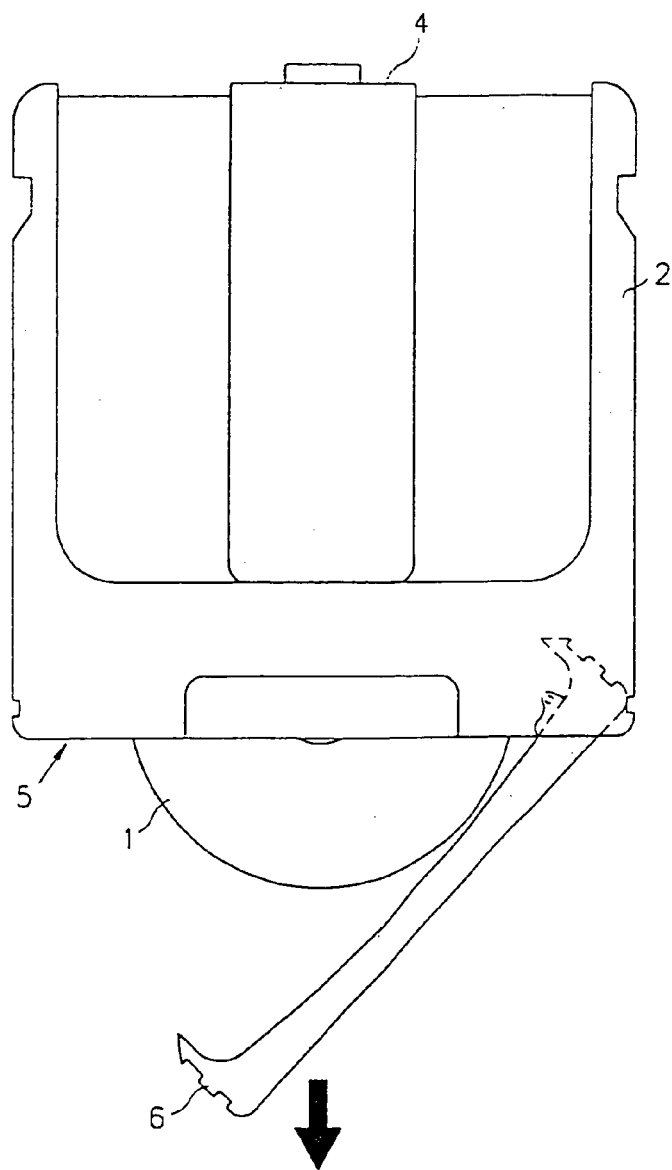
FIG. 1 is a view illustrating a conventional detachable disc cartridge.
Figure 2:
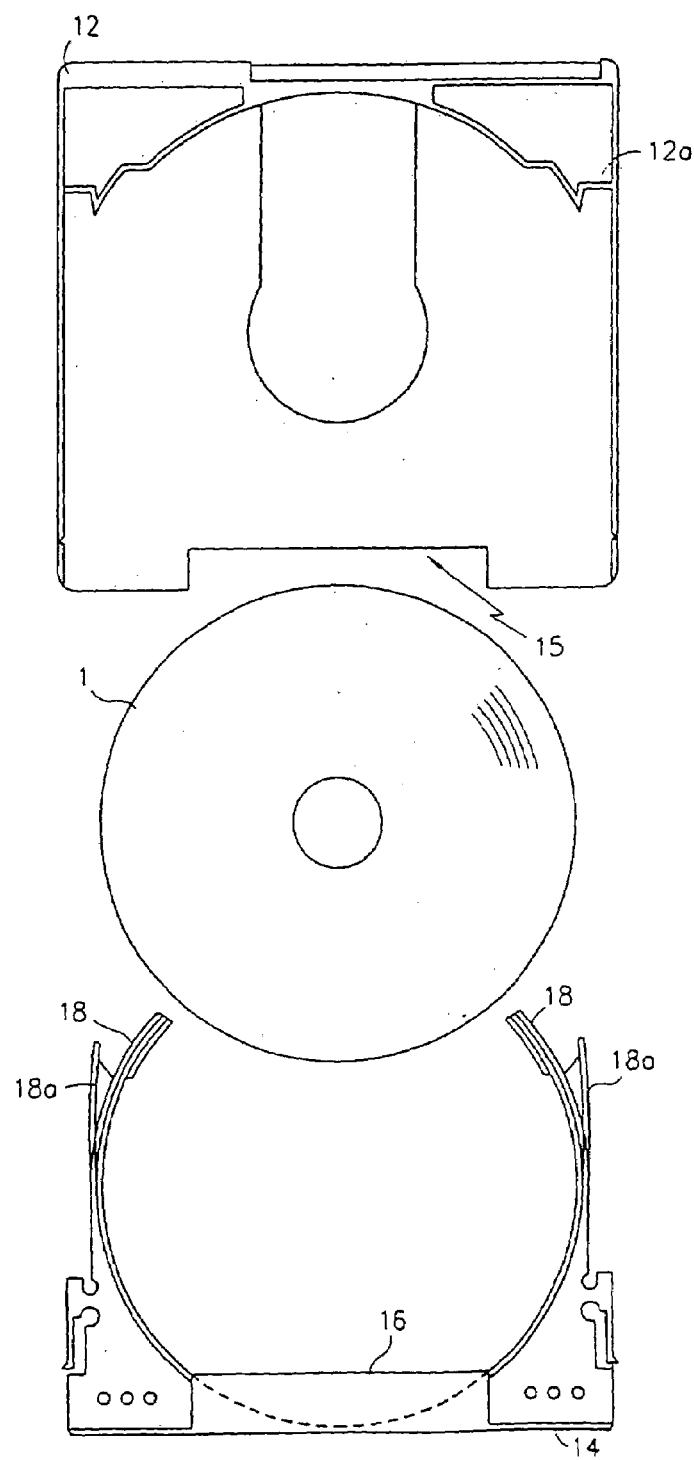
FIG. 2 is an exploded plan view illustrating the structure of the a cartridge body and a disc holder according to a first embodiment of the present invention.

As shown in FIG. 2, a disc cartridge according to the present invention includes a cartridge body 12 having a disc receiving space formed therein and slanted surfaces 12a which operate as guide members formed at an outer portion of the receiving space, and a disc holder 14 having semi-circular tension arms 18 which operate as elastic members for elastically supporting the disc 1.

A receiving port 15 is formed in an outer edge of the cartridge body 12, and a disc 1 inserted therethrough into the disc holder 14 is received into the interior of the cartridge body 12 via the receiving port 15.

The slanted surfaces 12a are integrally formed with the cartridge body 12 in a rib shape when injection-molding the cartridge body 12. These slanted surfaces 12a contact with the tension arms 18 when the disc holder 14 holding the disc 1 is received into the cartridge body 12, so that the tension arms 18 are pushed toward the respective lateral walls of the cartridge body 12 for thereby releasing a restricting force of the tension arms 18 with respect to the disc 1.

In addition, when the disc holder 14 is separated from the cartridge body 12, the tension arms 18 provide a certain elastic force to the disc 1 in a radial direction of the disc 1, so that the disc 1 is not separated from the disc holder 14.

In order to release the restriction force on the disc 1 and support the disc 1, shoulders 18a which are engaged to the slanted surfaces 12a are integrally formed at respective outer portions of the tension arms 18 being integral with the disc holder 14 when injection-molding the disc holder 14, and holder portion 16 is formed at an outer edge portion of the disc holder 14 for holding the disc holder 14.

Figure 3:
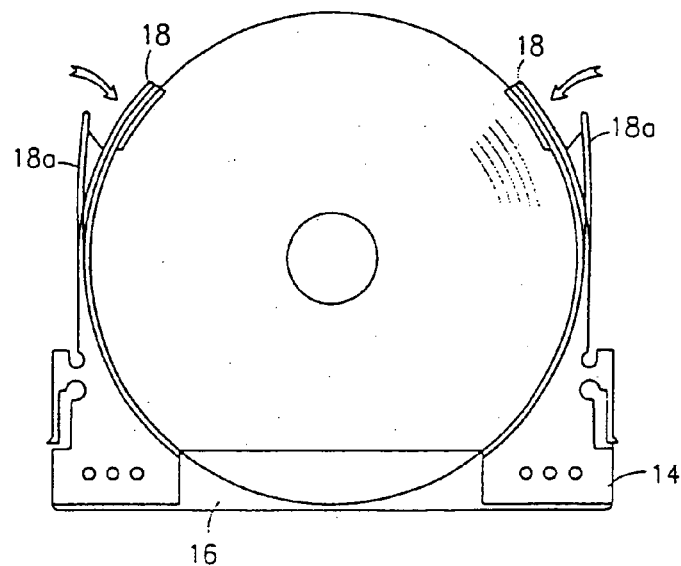
FIG. 3 is a plan view illustrating a state that a disc is inserted in a disc holder as shown in FIG. 2.

As shown in FIG. 3, the tension arms 18 elastically support the disc 1 using a certain radial force applied toward the center portion of the disc 1, so that the disc 1 is stably supported by the holding portion 16 and the tension arms 18.

The process by which the disc 1 is inserted into the cartridge body 12 will now be explained in detail.

As shown in FIG. 2, a disc 1 is first inserted by a user into the disc holder 14 through an opening formed between the outer end portions of the tension arms 18 in the direction of arrow. As the disc 1 is inserted, the tension arms 18, are spread outwardly and upon completion of the inserting operation, the tension arms 18 elastically hold the disc 1 against the holding portion 16.

At this state as shown in FIG. 3, the user holds the holding portion 16 of the disc holder 14 into the cartridge body 12 via the receiving port 15.

Upon inserting the disc holder 14 into the cartridge body 12, the shoulders 18a formed at the tension arms 18 contact with the slanted surfaces 12a of the cartridge body 12 before the disc holder 14 is inserted fully.

Figure 4:
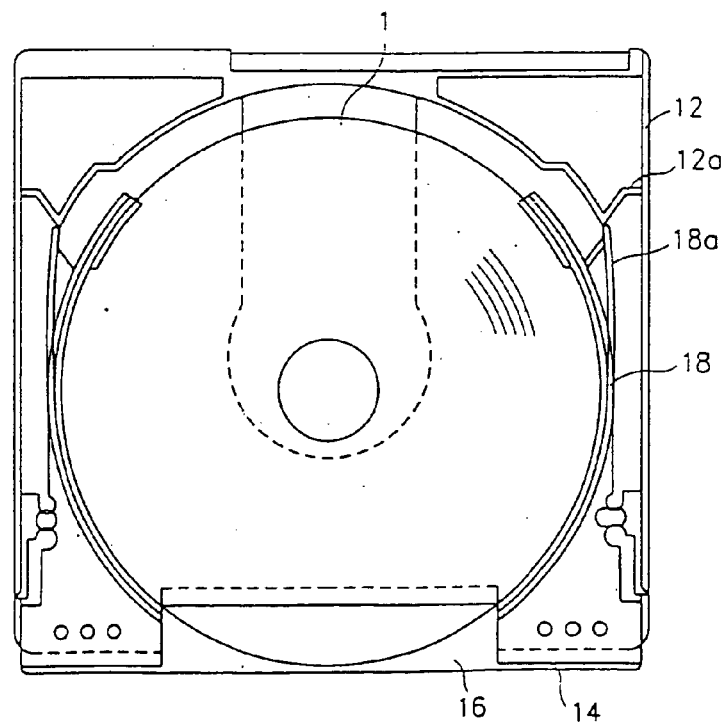
FIG. 4 is a plan view illustrating a state before a disc holder of FIG. 2 is inserted into a cartridge body.
Figure 5:
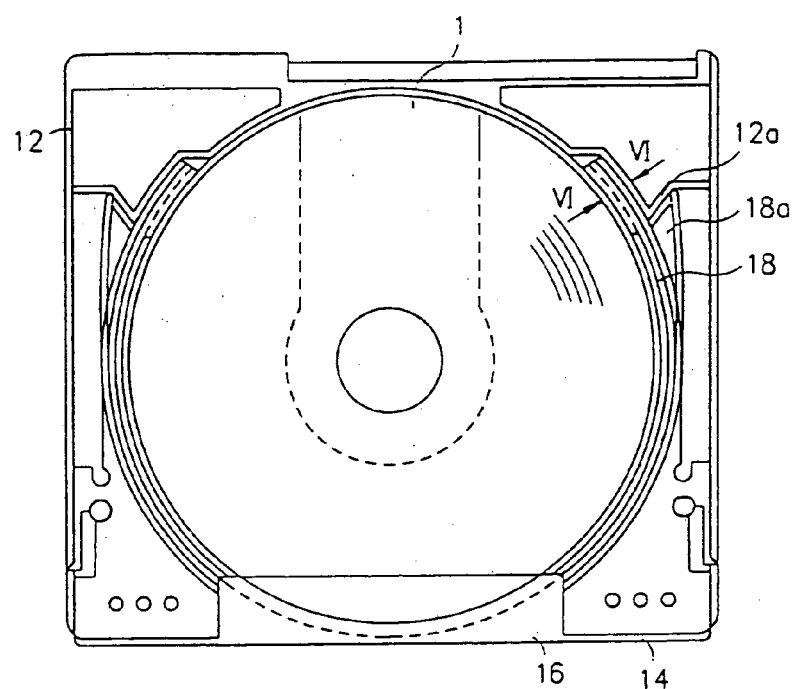
FIG. 5 is a plan view illustrating a state after a disc holder of FIG. 2 is inserted into a cartridge body.
Figure 6:
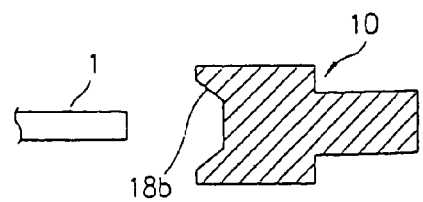
FIG. 6 is a cross-sectional view taken along line VI—VI of FIG. 5.

Namely, the shoulders 18a are moved toward the respective walls of the cartridge body 12 along the slanted surfaces 12a from the state of FIG. 4 to the state of FIG. 5, so that an elastic supporting force of the tension arms 18 with respect to the disc 1 is released.

The disc 1 is rotatably positioned in the cartridge body 12, so that a spindle motor (not shown) can rotate the disc 1, and the optical pick-up unit (not shown) can access the recording surface of the disc 1.

The converse operation by which the disc holder 14 is separated from the cartridge body 12 in order to remove the disc 1 from the cartridge body 12 will next be explained.

When separating the disc holder 14 from the cartridge 12, the restriction force exerted by the slanted surfaces 12a to the shoulders 18a is released, so that the tension arms 18 support the disc 1 by an elastic recovering force of the tension arms 18.

At this time, since a concave slanted surface 18b is formed in end portion of each tension arm 18, even when the disc 1 is moved up and down in the cartridge body 12, the disc 1 is stably guided to the center portion of the tension arms 18a, so that the tension arms 18 stably support the disc 1.

In the present invention, since the tension arms 18 which elastically support the disc 1 need have only a certain thickness compared to the height of the edge of the disc 1, the thickness of the disc holder 14 can be made small.

Figure 7A:
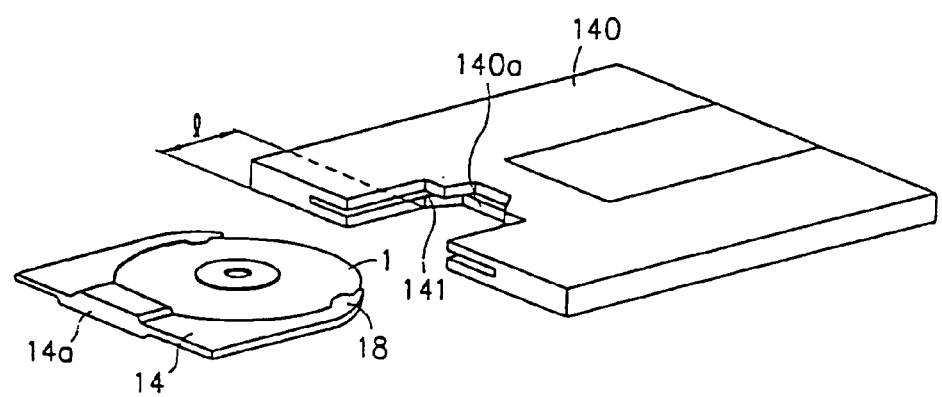
FIG. 7A is a perspective view illustrating an insertion relationship between an adapter and a disc holder according to a first embodiment of the present invention.

As shown in FIG. 7A, in order to record and reproduce a small size recording medium (for example, when the diameter of the disc is 80 mm) using a disc driving apparatus which is capable of recording or reproducing a large size recording medium (for example, when the diameter of the disc is 120 mm), a slanted surface (not shown) which has the above-described function may be formed in the interior of an adapter 140 having an outer size which is the same as the cartridge body of the large size recording medium for the reason that a certain compatibility with respect to other apparatuses is obtained because almost all driving apparatuses are recently designed to drive a large size recording medium.

In this case, the user can detachably mount the disc holder 14 with the disc 1 therein at the receiving port 141 of the adapter 140.

In the drawings, reference numeral "I" designated a length difference between the large size recording medium and the small size recording medium. The end portion 14a of the disc holder 14 is moved up to the center end portion 140a of the adapter 140 when inserting the disc holder 14 in the adapter 140 for thereby obtaining a certain size opening.

The disc cartridge according to a second embodiment of the present invention includes a certain structure so that the cartridge body and the disc holder can be inserted only in a certain orientation.

Figure 7B:
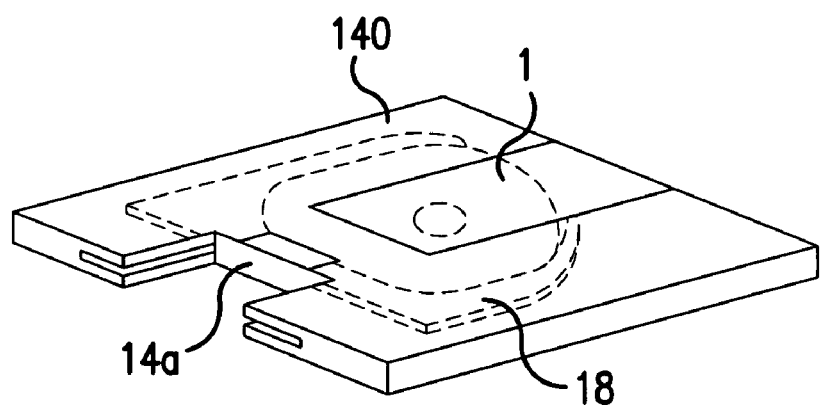
FIG. 7B is a perspective view illustrating the disc holder inserted into the adapter according to the first embodiment shown in FIG. 7A.

FIG. 7B is a perspective view illustrating the disc holder 14 being inserted into the adapter 140 (note FIG. 7A illustrates the disc holder 14 not inserted into the adapter 140). As shown in FIG. 7B, the predetermined opened distance l shown in FIG. 7A corresponds to a length distance between a larger size disc accommodated in a disc drive and a smaller size disc configured to be accommodated in the adapter 140. As shown, the end portion 14a of the disc holder 14 is flush with the end portion 140a of the adapter 140.

Figure 8:
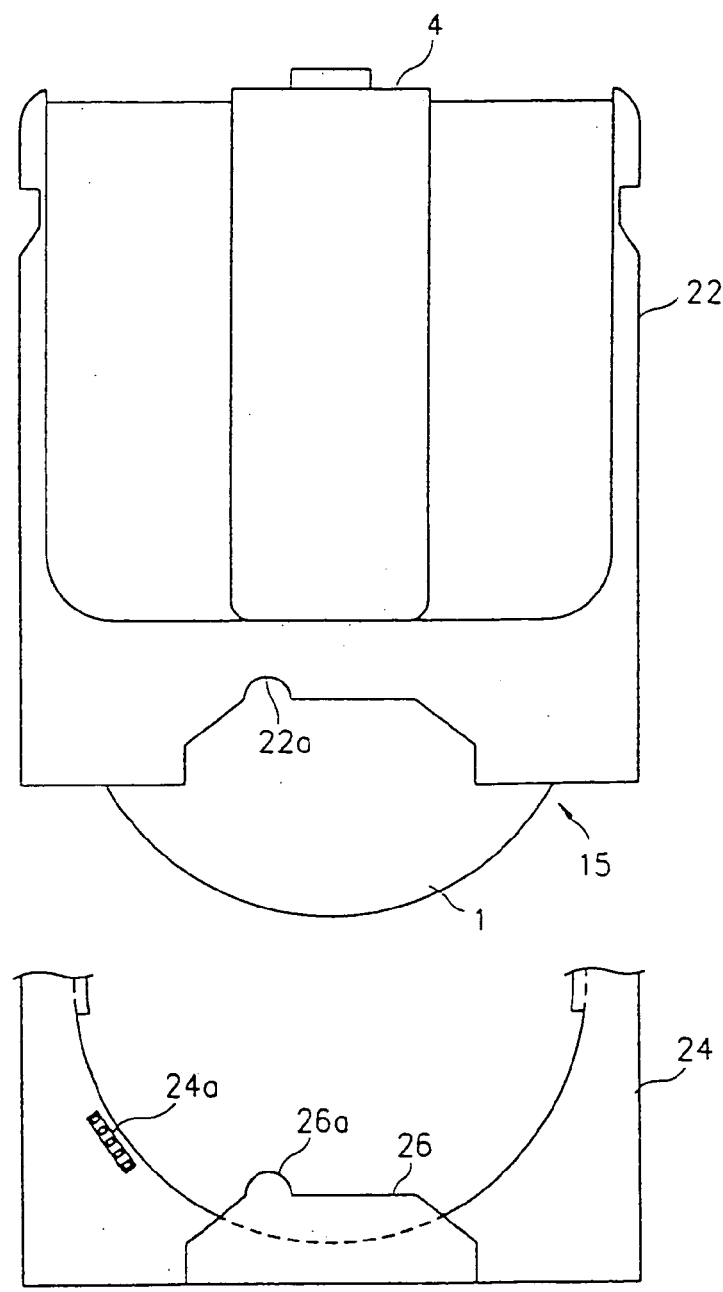
FIG. 8 is a plan view illustrating the structures of a disc cartridge according to a second embodiment of the present invention and a holder insertable into the disc cartridge.

As shown in FIG. 8, a groove 22a which is formed eccentrically in a leftward or rightward direction is formed in the cartridge body 22, and a protrusion 26a is formed on the disc holder 24 to be matingly insertable into the groove 22a.

The protrusion 26a is formed on the holding portion 26 and is eccentrically formed leftwardly or rightwardly to be opposite to the groove 22a.

Therefore, since the groove 22a and the protrusion engagable only in a certain opposed orientation, the disc holder 24 is received in the cartridge body 22 only in a certain orientation.

Namely, the disc holder 24 is not received in the cartridge body 22 in a state that the groove 22a does not correspond to the protrusion 26a.

A guide message 24a is written on the upper surface of the disc holder 24 for guiding an insertion direction when the disc 1 is inserted into the cartridge body 22.

As the guide message, there are "Recordable side of disc" or "Label side of disc" in accordance with the data recording surface or label surface of the disc 1, so that a user can recognize the insertion direction of the disc 1.

Therefore, the user can insert the disc holder into the cartridge body 22 in a certain orientation based on an asymmetrical shape of the cartridge body 22 and the disc holder 24, and the insertion direction of the disc 1 is coincided with the insertion direction of the cartridge body 22 and the disc holder 24 based on the guide message 24a.

Figure 9:
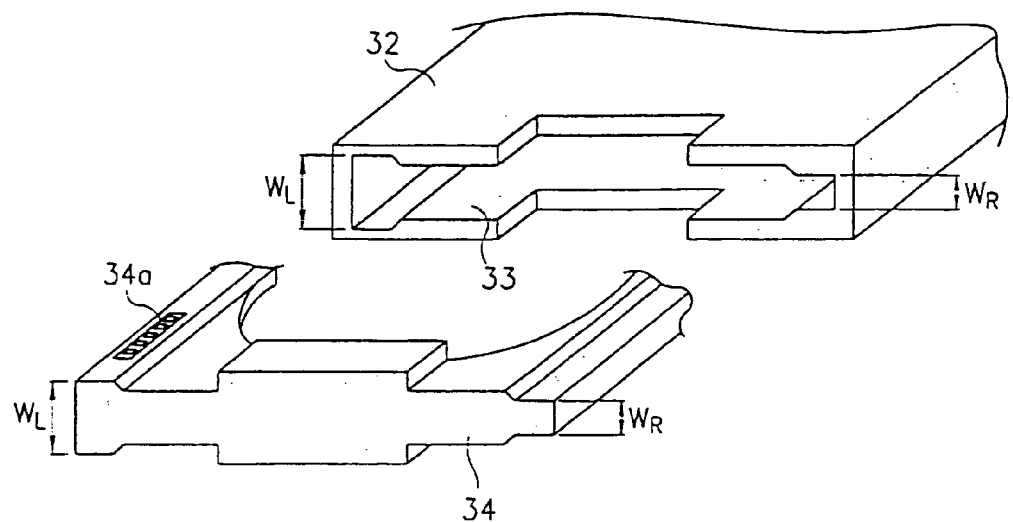
FIG. 9 is a partial perspective view illustrating a disc cartridge according to a third embodiment of the present invention and a holder insertable in the disc cartridge.

As shown in FIG. 9, the disc cartridge according to a third embodiment of the present invention includes a cartridge body 32 having an asymmetrically shaped receiving port 33, and a disc holder 34 having an asymmetrically shaped end portion corresponding to the receiving port 33.

In the embodiment of FIG. 9, the width $W_L$ between the receiving port 33 and the left edge portion of the disc holder 34 received in the receiving port 33 is wider than the width $W_R$ of the right edge portion.

Namely, if the shape of the disc holder 34 received in the cartridge body 32 is not coincided with the shape of the receiving port 33 of the cartridge body 32, the disc holder 34 is not received thereinto, so that a certain insertion orientation is implemented.

A guide message 34a is formed on the upper surface of the disc holder 34 as shown in FIG. 9 to inform the user of the insertion orientation of the disc 1 in the same manner as in the embodiment of FIG. 8.

Figure 10:
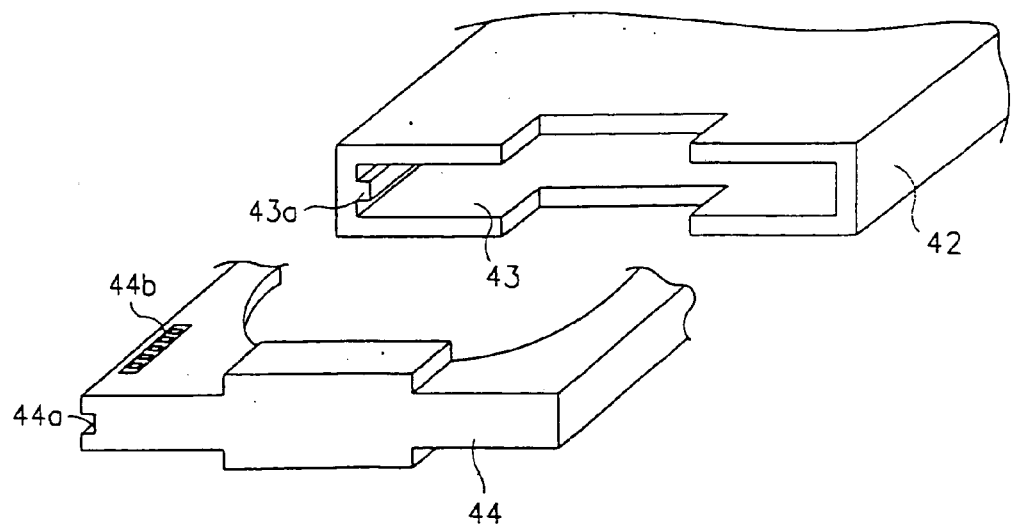
FIG. 10 is a partial perspective view illustrating a disc cartridge according to a fourth embodiment of the present invention and a holder insertable in the disc cartridge.

FIG. 10 is a perspective view illustrating a disc cartridge according to a fourth embodiment of the present invention.

As shown therein, the disc cartridge according to the fourth embodiment of the present invention includes a cartridge body 42 in which a rail 43a is protruded from a lateral wall of a receiving port 43, and a disc holder 44 having a groove 44a which is opposite to the rail 43a.

In the embodiment of FIG. 10, the rail 43a is formed only at a left lateral wall of the receiving port 43 and has a certain height, and a rail is not formed at the right lateral wall.

Namely, when the disc holder 44 is inserted into the cartridge body 42, if the groove 44a in the disc holder 44 and the rail 43a of the cartridge 42 are not corresponding engaged with each other, the disc holder 44 is not received into the cartridge body 42. Therefore, the disc holder 44 is received only in a certain orientation.

A guide message 44b is formed on the upper surface of the disc holder 44 of the fourth embodiment of the present invention to inform the user of the insertion orientation of the disc 1 in the same manner as in the embodiments of FIGS. 8 and 9.

In the adapter 140 of FIGS. 7A and 7B which is used for recording and reproducing a double sided or single sided recording medium using a disc driving apparatus capable of recording or reproducing a large sized recording medium, the receiving port 141 of the adapter 140 and the disc holder 14 received in the receiving port 141 are asymmetrically formed, so that the disc holder 14 is received into the adapter 140 only in a certain orientation.

In this case, a guide message may be printed on a certain portion of the adapter 140 to inform the user of the insertion orientation of a small sized recording medium.

Figure 11:
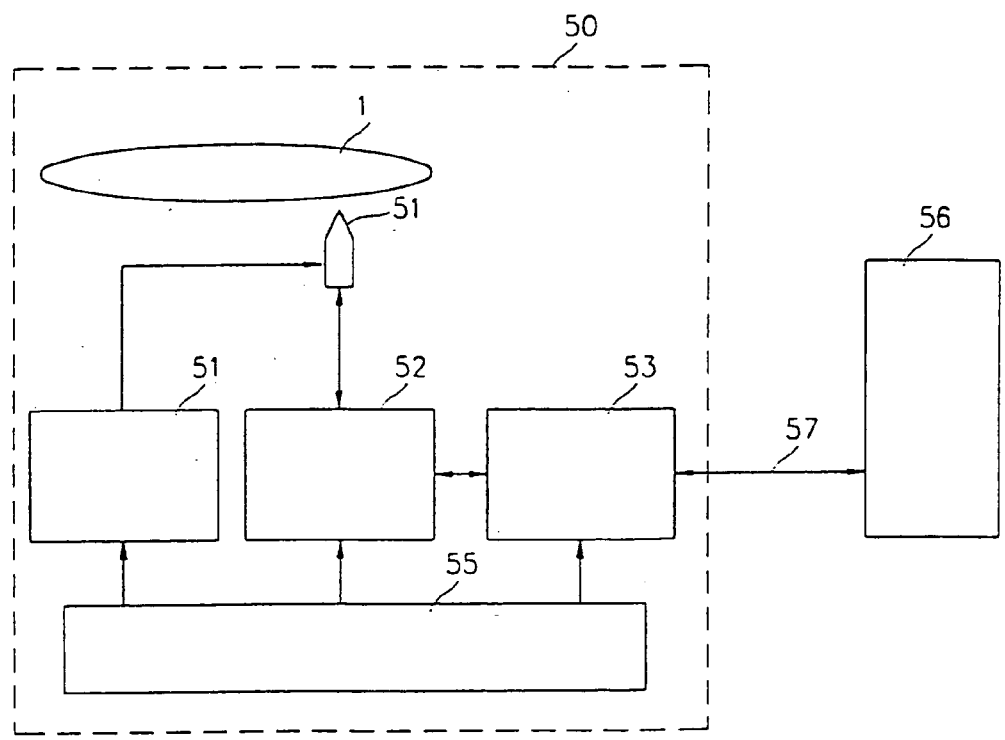
FIG. 11 is a schematic block diagram illustrating an optical disc recording and reproducing unit according to the present invention.

As shown in FIG. 11, the disc recording and reproducing unit 50 which drives the disc 1 includes an optical pick-up unit 51 recording and reproducing data on/from the disc 1, an optical pick-up unit transport unit 51 the optical pick-up unit 51, a data processing unit 52 processing the data inputted and transferring the processed data to the optical pick-up 51, an interface unit 53, and a controller 55 controlling the operations of the above-described elements. The interface unit 53 of the optical disc recording apparatus is connected with a host 56, so that certain instructions and data 57 are communicated therebetween.

As described above, the disc protection casing and a drive for receiving the same according to the present invention are capable of preventing a data recording surface of a disc from being contaminated when inserting and removing the disc.

In the present invention, since the disc is inserted in the disc holder, a user is able to easily insert a disc into a cartridge and remove the disc from the cartridge.

In the single sides disc cartridge according to the present invention, since the cartridge body and the disc holder are asymmetrically formed, a certain insertion orientation is implemented for thereby preventing an erroneous operation of the apparatus.

In the present invention, since there is provided a guide message for informing a user of the insertion orientation of the disc, it is possible to prevent an erroneous insertion of the disc holder into the cartridge body.

Although the preferred embodiments of the present invention have been disclosed for illustrative purposes, those skilled in the art will appreciated that various modifications, additions and substitutions are possible. Without departing from the scope and spirit of the invention as recited in the accompanying claims.

What is claimed is:

1. A disk protection casing, comprising:
   a casing body having a receiving space therein and an access port formed in a first side of the casing body; and
   a disk holder insertable into an interior of the casing body via the access port, and one of the disk holder and the first side of the casing body being structured such that the disk holder is prevented from being incorrectly inserted into the casing body,
   wherein the disk holder includes an elastic member for supporting a disk therein, and the casing body is formed so as to set the disk holder with a change of an elastic supporting force of the elastic member with respect to the disk when the disk holder is inserted into the interior of the casing body,
   wherein the disk holder is configured to be inserted into the access port such that a predetermined opened distance of the access port remains between an outer edge of the disk holder and an outer edge of the casing body.

2. The disk protection casing of claim 1, wherein the predetermined opened distance corresponds to a length difference between a larger size disk accommodated in a disk drive and a smaller size recording medium configured to be held in the disk holder and accommodated in the disk drive.

3. The disk protection casing of claim 2, wherein the larger size disk has a diameter of about 120 mm and the smaller size disk has a diameter of about 80 mm.

4. The disk protection casing of claim 1, wherein a portion formed at the elastic member is moved toward walls of the casing body when the disk holder is inserted into the interior of the casing body, thereby changing the elastic supporting force of the elastic member.

5. The disk protection casing of claim 4, wherein the casing body includes slanted surfaces that are contacted with shoulders of the elastic member when the disk holder is inserted into the interior of the casing body, thereby moving shoulders of the elastic member toward walls of the casing body.

6. The disk protection casing of claim 1, wherein the disk holder includes a convex-shaped holding portion and the access port of the casing body comprises a concave shape such that the disk holder is prevented from being incorrectly inserted into the casing body.

7. A disk protection casing, comprising:
   a casing body having a receiving space therein and an access port formed in a first side of the casing body; and
   a disk holder insertable into an interior of the casing body via the access port, and one of the disk holder and the first side of the casing body being structured such that the disk holder is prevented from being incorrectly inserted into the casing body,
   wherein the disk holder includes an elastic member for supporting a disk therein, and the casing body is formed so as to set the disk holder with a change of an elastic supporting force of the elastic member with respect to the disk when the disk holder is inserted into the interior of the casing body,
   wherein the elastic member includes inner and outer elastic branches separable from each other, and wherein the outer branches engage with a rib within the casing body and extend outwardly therefrom and the inner branches do not engage with the rib and extend beyond the rib and grasp or release edges of a disc placed in the disc holder.

8. A disk casing, comprising:
   a case body having a receiving space therein and an access port formed in a first side of the case body; and
   a disk holder insertable into an interior of the case body via the access port, and one of the disk holder and the first side of the case body being structured such that the disk holder is prevented from being incorrectly inserted into the case body,
   wherein the disk holder includes an elastic member for supporting a disk therein, and the case body is formed so as to set the disk holder with its elastic deformation in a condition of entering the disk in the case body,
   wherein the disk holder is configured to be inserted into the access port such that a predetermined opened distance of the access port remains between an outer edge of the disk holder and an outer edge of the case body.

9. The disk casing of claim 8, wherein the predetermined opened distance corresponds to a length difference between a larger size disk accommodated in a disk drive and a smaller size recording medium configured to be held in the disk holder and accommodated in the disk drive.

10. The disk casing of claim 9, wherein the larger size disk has a diameter of about 120 mm and the smaller size disk has a diameter of about 80 mm.

11. The disk casing of claim 8, wherein a portion formed at the elastic member is moved toward walls of the case body when the disk holder is inserted into the interior of the case body, thereby changing the elastic supporting force of the elastic member.

12. The disk casing of claim 11, wherein the case body includes slanted surfaces that are contacted with shoulders of the elastic member when the disk holder is inserted into the interior of the case body, thereby moving shoulders of the elastic member toward walls of the case body.

13. The disk casing of claim 8, wherein the disk holder includes a convex-shaped holding portion and the access port of the case body comprises a concave shape such that the disk holder is prevented from being incorrectly inserted into the case body.

14. A disk casing, comprising:
   a case body having a receiving space therein and an access port formed in a first side of the case body; and a disk holder insertable into an interior of the case body via the access port, and one of the disk holder and the first side of the case body being structured such that the disk holder is prevented from being incorrectly inserted into the case body, wherein the disk holder includes an elastic member for supporting a disk therein, and the case body is formed so as to set the disk holder with its elastic deformation in a condition of entering the disk in the case body, and wherein the elastic member includes inner and outer elastic branches separable from each other, and wherein the outer branches engage with a rib within the case body and extend outwardly therefrom and the inner branches do not engage with the rib and extend beyond the rib and grasp or release edges of a disk placed in the disk holder.

* * * * *